United States Patent
Dai et al.

(10) Patent No.: US 7,412,568 B2
(45) Date of Patent: Aug. 12, 2008

(54) METHOD FOR THREAD CACHING

(75) Inventors: Jinquan Dai, Shanghai (CN); Long Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 11/462,465

(22) Filed: Aug. 4, 2006

(65) Prior Publication Data
US 2008/0034164 A1    Feb. 7, 2008

Related U.S. Application Data

(63) Continuation of application No. PCT/CN2005/000945, filed on Jun. 29, 2005.

(51) Int. Cl.
*G06F 12/02* (2006.01)

(52) U.S. Cl. ............... 711/141; 711/108; 711/130; 711/147; 711/154; 711/3; 709/213; 709/214; 709/216

(58) Field of Classification Search ............ 711/3, 711/108, 130, 141, 147, 154; 712/225; 709/213, 709/314, 216, 231, 238
See application file for complete search history.

(56) References Cited

U.S. PATENT DOCUMENTS

| | | |
|---|---|---|
| 6,092,154 A | 7/2000 | Curtis et al. |
| 6,665,704 B1 | 12/2003 | Singh |
| 6,675,261 B2 | 1/2004 | Shandony |
| 2007/0192545 A1 | 8/2007 | Gara et al. ............ 711/141 |

*Primary Examiner*—Jack A Lane
(74) *Attorney, Agent, or Firm*—Schwegman, Lundberg & Woessner, P.A.

(57) ABSTRACT

Methods, apparatus, and systems are provided for caching. A caching process is automatically modified in response to update eligibility and an interference relation for a plurality of threads. Data is read into a cache, and a reference to the data is provided to a plurality of threads. An initial thread receives a signal from a last thread once the last thread has the reference to the data. The initial thread, in response to the signal, modifies the data and updates changes to the data within the cache and then sends another signal to a next thread, indicating that the next thread may now perform a volatile operation on the data within the cache.

13 Claims, 11 Drawing Sheets a
METHOD FOR THREAD CACHING

This application is a continuation under 35 U.S.C. 111(a) of International Application No. PCT/CN2005/000945, filed on 29 Jun. 2005, which is incorporated herein by reference.

TECHNICAL FIELD

The teachings presented herein relate to data processing and more particularly to software caching.

BACKGROUND INFORMATION

A unique challenge of packet processing is to maintain stability while maximizing throughput and minimizing latency for the worse-case traffic scenarios. On the other hand, the latency associated with a single external memory access within network processors is usually larger than a worse-case service time. Consequently, modern network processors are usually implemented with a highly parallel architecture with multiple processors. Each processor can support a plurality of processing threads (applications).

Additionally, network applications may also be highly parallel and are usually multi-threaded and/or multi-processed for purposes of hiding long memory access latencies. Whenever a new packet arrives at a network processor a series of tasks (e.g., receipt of the packet, routing table look-up, enqueuing, etc.) is performed on that packet by a new thread within the network processor. However, updates associated with the global data or the packet for packet processing have to be performed in a pre-defined thread order and in an atomic fashion in order to ensure that the integrity of the packet's processing is maintained amongst multiple competing threads that may update the data or the packet.

To ensure packet-processing integrity, an ordered section or update process for the global data or the packet is typically implemented within network processors. In this process, packets are distributed to a chain of threads in an order in which the packets are received. Each thread has to wait for a signal from a previous thread before entering its ordered section update process; after the signal is received, the waiting thread can read the data or the packet, modify it, and write it back to memory, and then send a signal of completion to a next waiting thread.

This process creates latencies for non-volatile operations, such as the latency associated with read operations that cannot be hidden even with a multithreaded and/or multiprocessing environment.

DESCRIPTION OF EMBODIMENTS

Figure 1A:
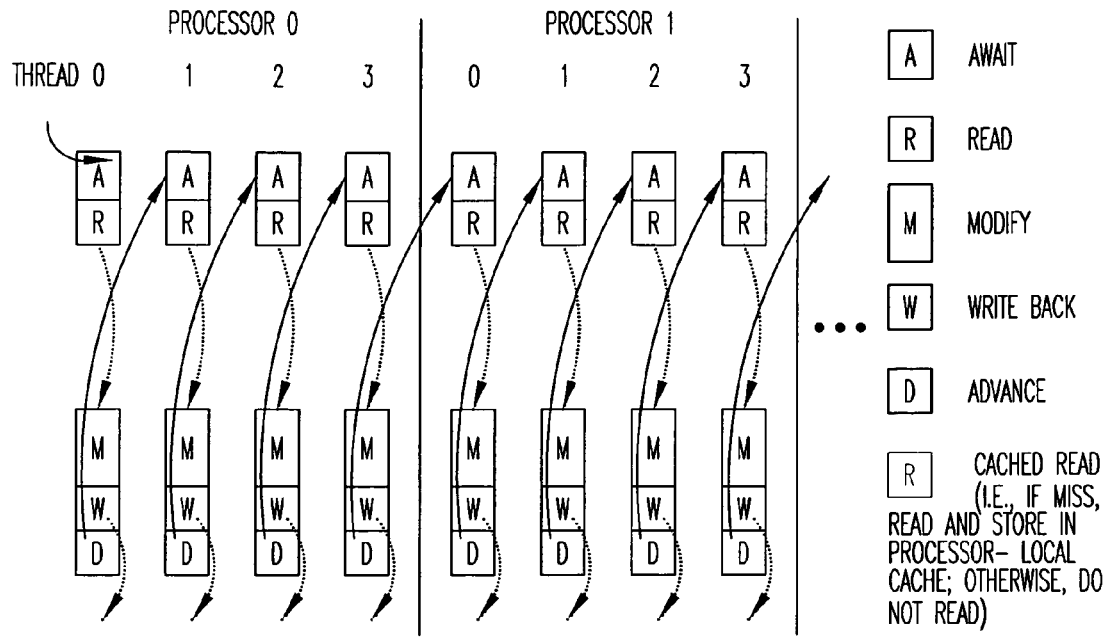
FIGS. 1A and 1B are diagrams associated with processing data in a multi-threaded and multi-processing environment, according to an example embodiment.
Figure 1B:
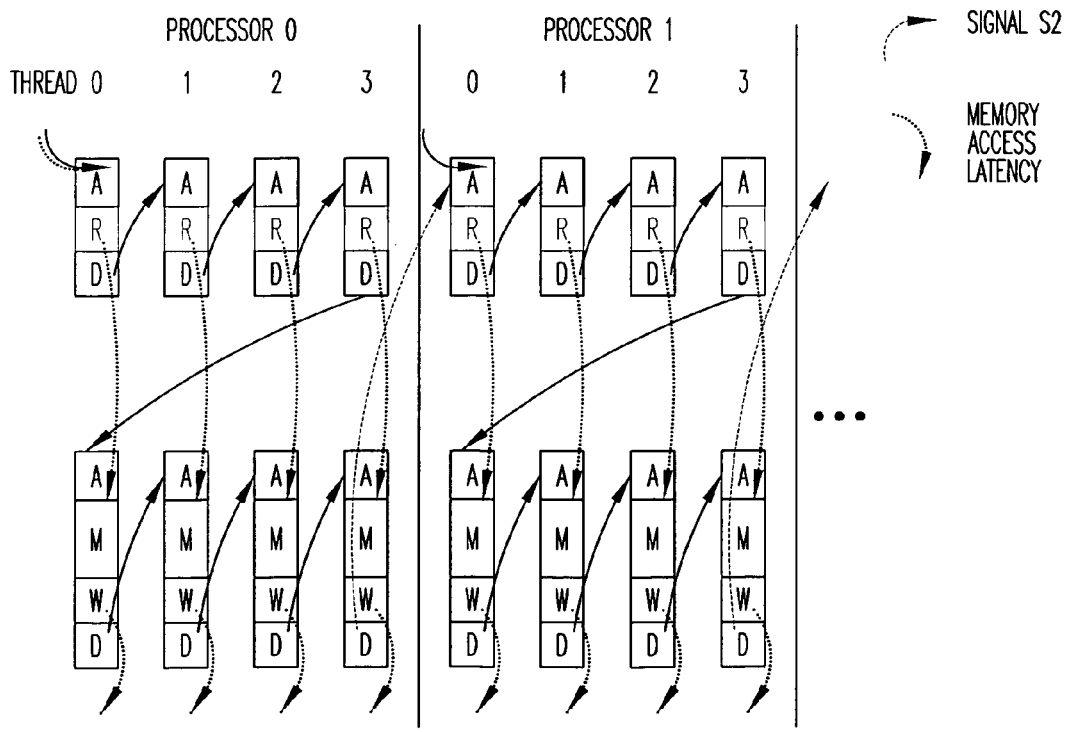

FIGS. 1A and 1B are diagrams associated with processing global data in a multi-threaded and multi-processing environment, according to an example embodiment. The diagrams of FIGS. 1A and 1B depict the processing for multiple threads within multiple processors, beginning with Thread 0 and Processor 0. A combined legend for both of the diagrams appears in the diagram on the right-hand side of FIGS. 1A and 1B.

The processing is associated with global data or packets being handled in a multi-threaded and multi-processing environment, where each thread desires access to the data or packet and where each thread can potentially modify or update the data or packet. The processing (hereinafter referred to as "update processing for shared data") is implemented as software-controlled caching instructions in FIG. 1B stored within a machine-accessible and readable storage medium or is accessible over a network. The network may be wired, wireless, or a combination of wired and wireless.

In FIG. 1A, each thread initially waits for a signal that it is okay to read the desired global data or packet from cache. It can be seen in FIG. 1A that a next thread does not get read access to the data until a prior thread has completed any changes that it desires to make to that data and writes that data back into the cache. This creates memory access latency with each thread that does not have update rights to the data.

The latency associated with the processing of FIG. 1A is hidden by the processing depicted in FIG. 1B. More specifically, the update processing for shared caching in FIG. 1B permits each thread within a given processor to acquire the data for read purposes before any particular thread is given update (volatile) access to the data within the cache. For example, Threads 0-3 of Processor 0 each pass signals to one another in succession or substantially in parallel until each Thread 0-3 has a reference to the data within the cache. However, Thread 0 waits until it receives a signal from the last Thread 3 before it proceeds with its volatile operation against the data within the cache.

The signal from Thread 3 to Thread 0 within Processor 1 informs Thread 0 that all Threads 0-3 within Processor 0 now have read access to the data and that it is now permissible for Thread 0 to perform a volatile (write) on the data within the cache. At this point, Thread 0 has exclusive write access to the data within the cache. The remaining threads have read access to the data within the cache while Thread 0 has exclusive write access to the same data within the cache.

Once Thread 0 modifies and writes the changes to the data back to the cache, Thread 0 sends a signal to the next thread (Thread 1), which gives the next thread exclusive write access to the data within the cache. This processing continues until the last thread (Thread 3) performs its update on the data within the cache, and a signal is made to a next processor (Processor 1) and its initial thread (Thread 0). This type of processing can continue for N-1 processors, each having Y-1 threads, wherein N and Y are integer numbers that begin at 0.

The update processing for shared caching of FIG. 1B is achieved because a read operation is non-volatile and is typically issued by a processor on a cache miss. Thus, if threads desire access to the same global data or packet, then there is no cache miss when each thread initially requests access to the data and a reference to the data within the cache can be provided substantially in parallel to each thread within a given processor. On the other hand, if there is a cache miss, then the threads desire access to the different data or packet and the load of the data to cache can be issued substantially in parallel. This reduces latency for initially acquiring access to the data within a multi-threaded environment.

The update processing for shared caching of FIG. 1B may be implemented as software-controlled caching within network processors as a two-phase process: a read phase and an update phase.

Figure 2:
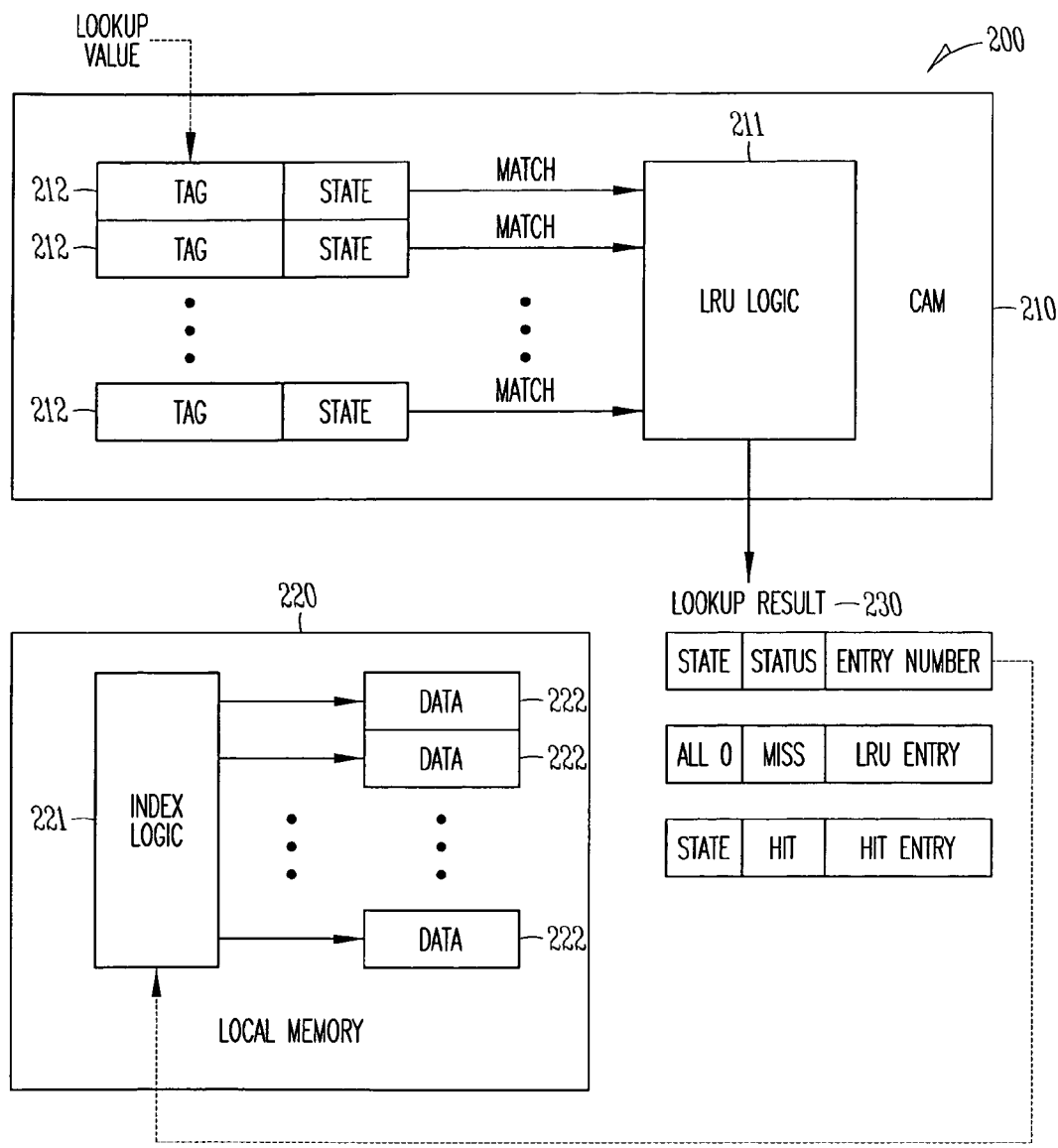
FIG. 2 is a diagram of caching system used in processing data in a multi-threaded and multi-processing environment, according to an example embodiment.

FIG. 2 is a diagram of caching system 200 used in processing data in a multi-threaded and multi-processing environment, according to an example embodiment. The caching system 200 is implemented in machine-accessible and readable storage media within an environment of a processor, such as a network processor.

The caching system 200 includes content-addressable memory (CAM) 210 and local memory 220. The CAM 220 and the local memory 220 are programmed to provide the software-controlled caching depicted in FIG. 1B.

The CAM 210 includes least recently used (LRU) logic 211 and a plurality of entries 212. The entries 212 store state and tag portions of a particular cached entry line for data. The LRU logic 211 maintains a time-ordered list of entries used within the CAM 210.

The local memory 220 may be an indexed register file 221, in which the data portion 222 of cache lines can be stored. Each related cache operation (e.g., lookup for a tag 230, load data, write back data, etc.) is under the software control.

In an embodiment, the CAM 210 may be partitioned into a plurality of several logical CAM's 210. This allows multiple un-coordinated caching operations in a thread.

The software-controlled caching system 200 is programmed with instructions to perform the update processing for shared caching, which is represented graphically by FIG. 1B. This update processing may be visualized as a two-phase process, a read phase and an update phase. Each thread completes the read phase before the update phase begins. Moreover, the read phase may be provided to each of the threads in parallel or substantially in parallel. That is, for the completion of the read phase each thread experiences little to no latency with initially acquiring read access to the data from the cache.

Figure 3A:
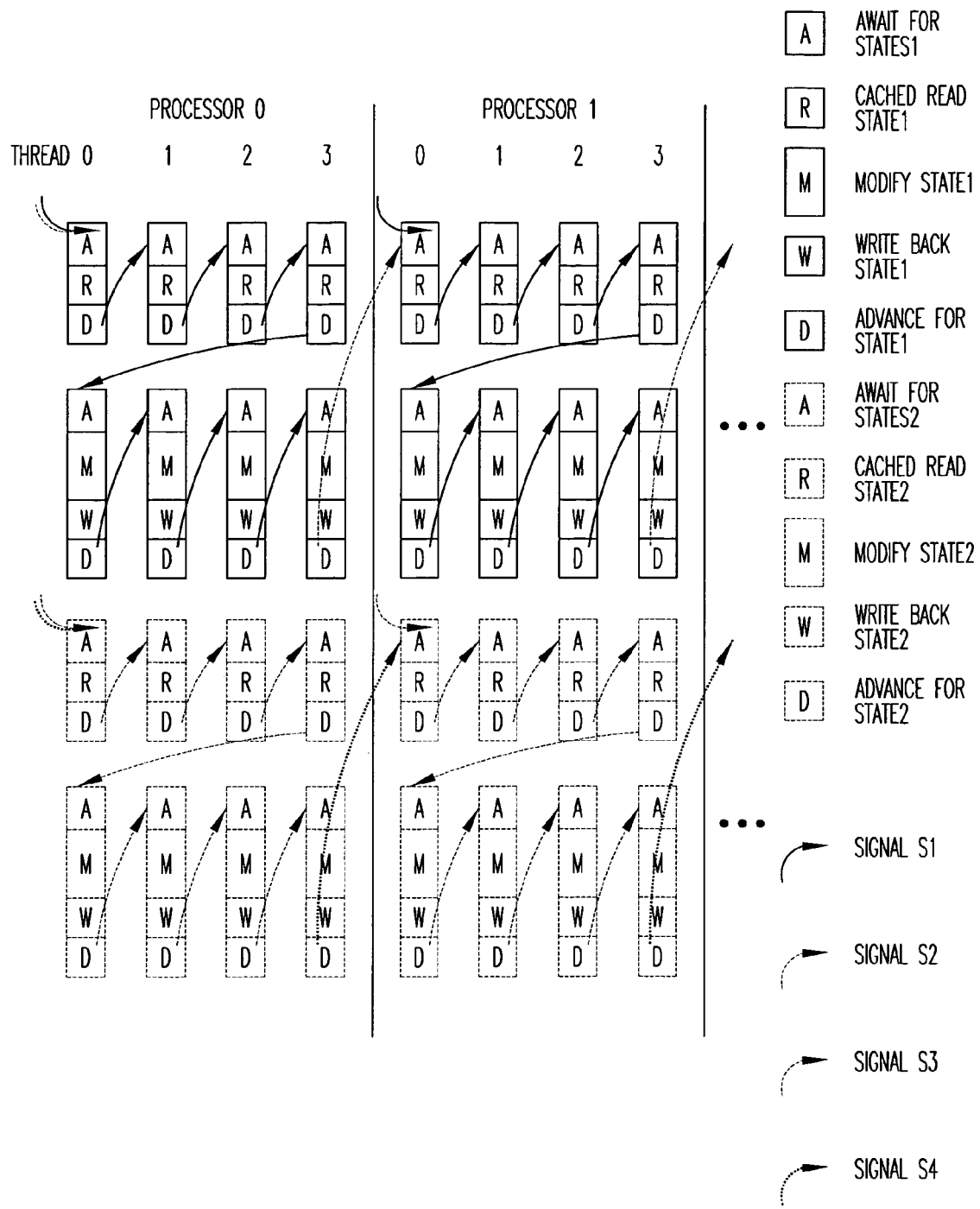
FIGS. 3A and 3B are diagrams associated with processing data in a multi-threaded and multi-processing environment using different and same content-addressable memory units, according to an example embodiment.
Figure 3B:
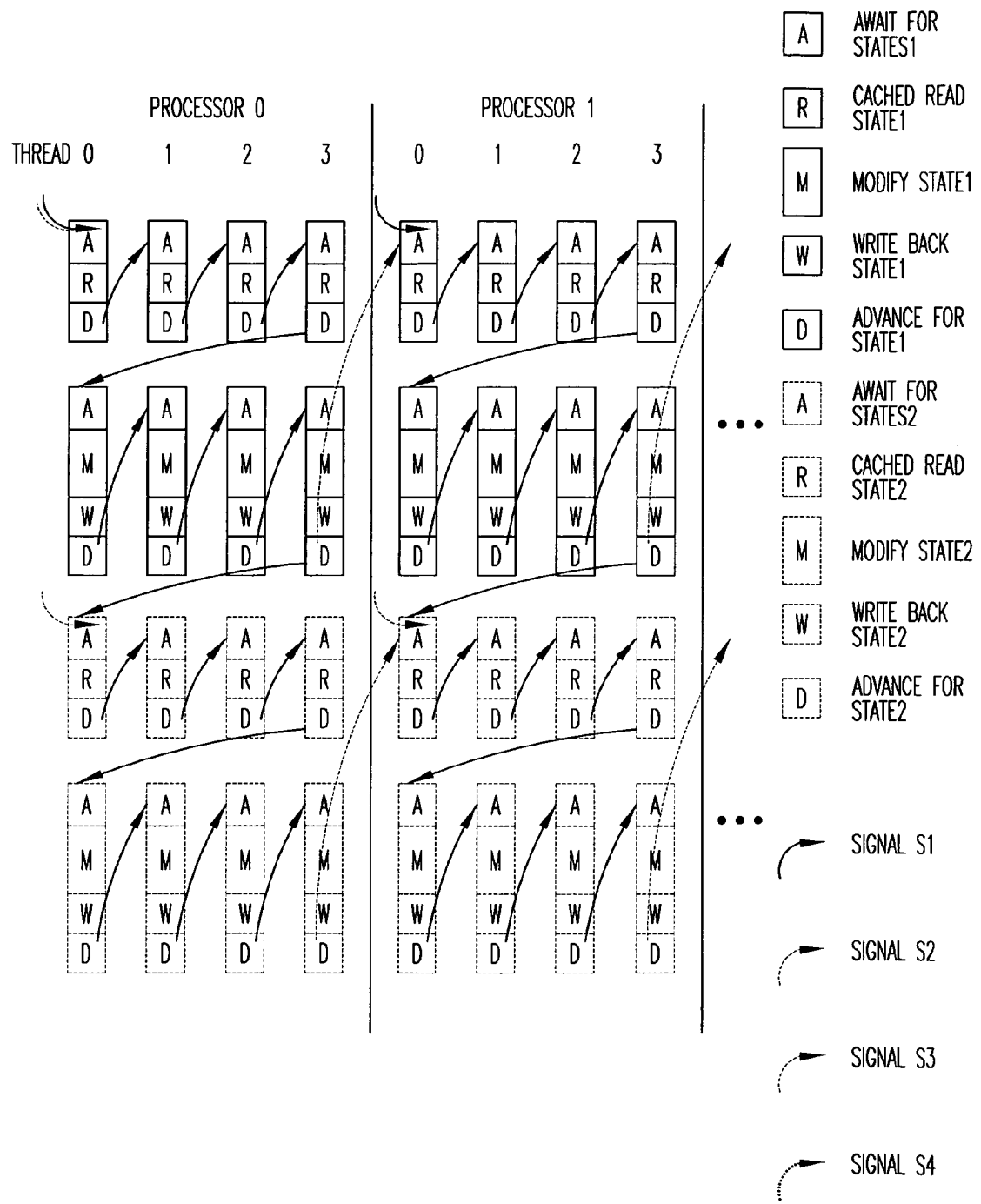

FIGS. 3A and 3B are diagrams associated with processing data in a multi-threaded and multi-processing environment using different and same content-addressable memory units (CAM's), according to an example embodiment. The processing is implemented in a machine-accessible and readable storage medium.

FIG. 3A depicts scalable caching using different logical CAM's. In FIG. 3A, the two update processes using different CAM's are separated from one another vertically in FIG. 3A. Both update processes execute independently of one another and do not have to receive a signal from one another to proceed. In manners similar to what was discussed with respect to FIG. 1B, a last Thread 3 of Processor 0 within a single update process signals an initial Thread 0 once it has a read reference and Thread 0 is free to perform a volatile operation against the data within the logical CAM. Once the last Thread 3 completes its volatile operation against the data, a signal is sent from Thread 3 of Processor 0 to Thread 0 of Processor 1.

FIG. 3B depicts scalable caching using multiple same logical CAM's. With FIG. 3B, once Thread 3 of Processor 0 completes its volatile processing on the data within the first update process, a signal is sent from Thread 3 to Processor 1 Thread 0, and another signal is sent to Processor 0 Thread 0 for the second update process. That is, if different caching uses the same logical CAM's, the different caching should be coordinated in such a way that the first caching is completed by all the threads in the processor before the second caching can be performed by any thread in the processor.

Figures 4A, 4B:
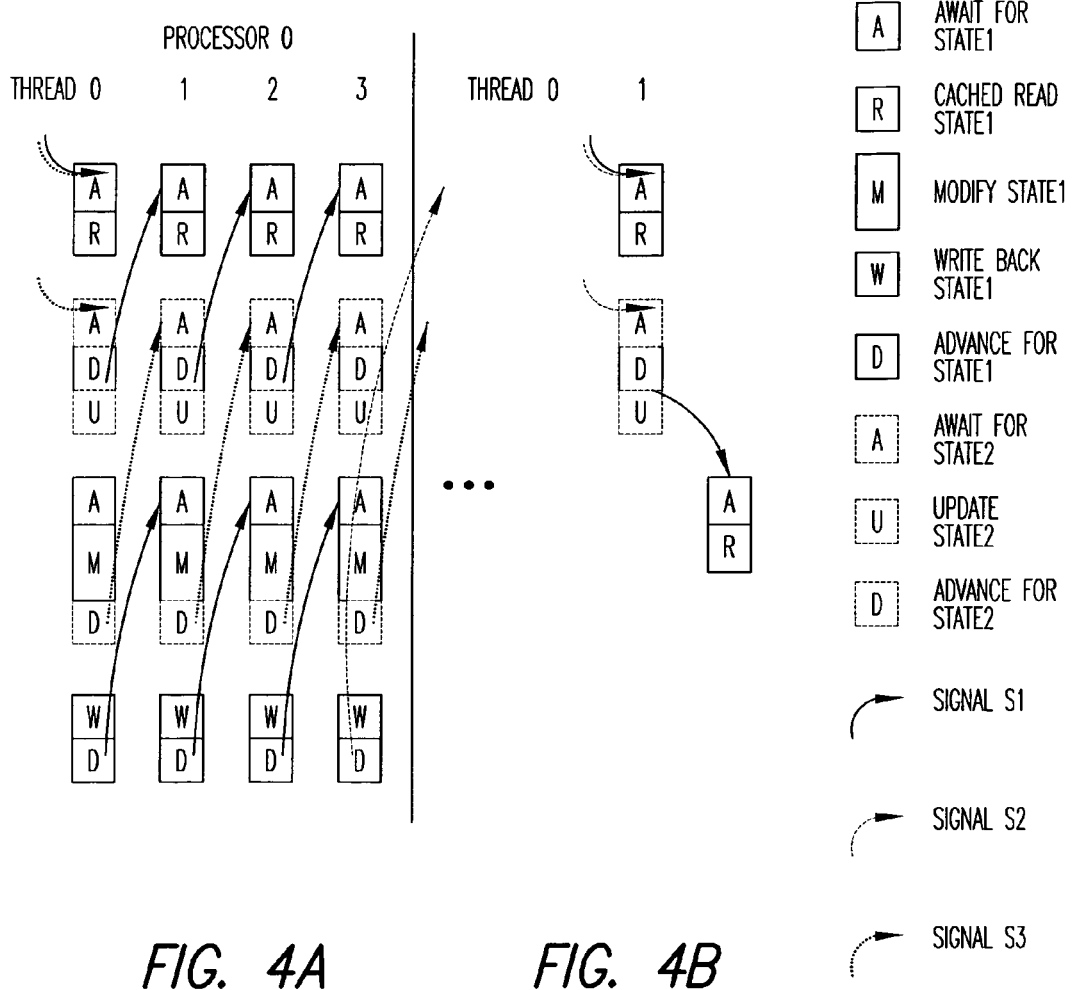
FIGS. 4A and 4B are diagrams associated with deadlocks while processing data in a multi-threaded and multi-processing environment, according to an example embodiment.

FIGS. 4A and 4B are diagrams associated with deadlocks while processing data in a multi-threaded and multi-processing environment, according to an example embodiment.

With software-controlled caching, a first thread in a processor may wait for signals from a last thread in the processor. This waiting is evidenced in FIG. 1B, where Thread 0 waits for a signal from Thread 3 before entering an update phase with respect to the data in the cache. As another example, consider if update processing is implemented as shown in FIG. 4A, the execution of the thread may never move beyond what is shown in FIG. 4B. Accordingly, software-controlled caching should be implemented after it is determined that update processing associated with an application's threads is free of deadlock.

Figure 5:
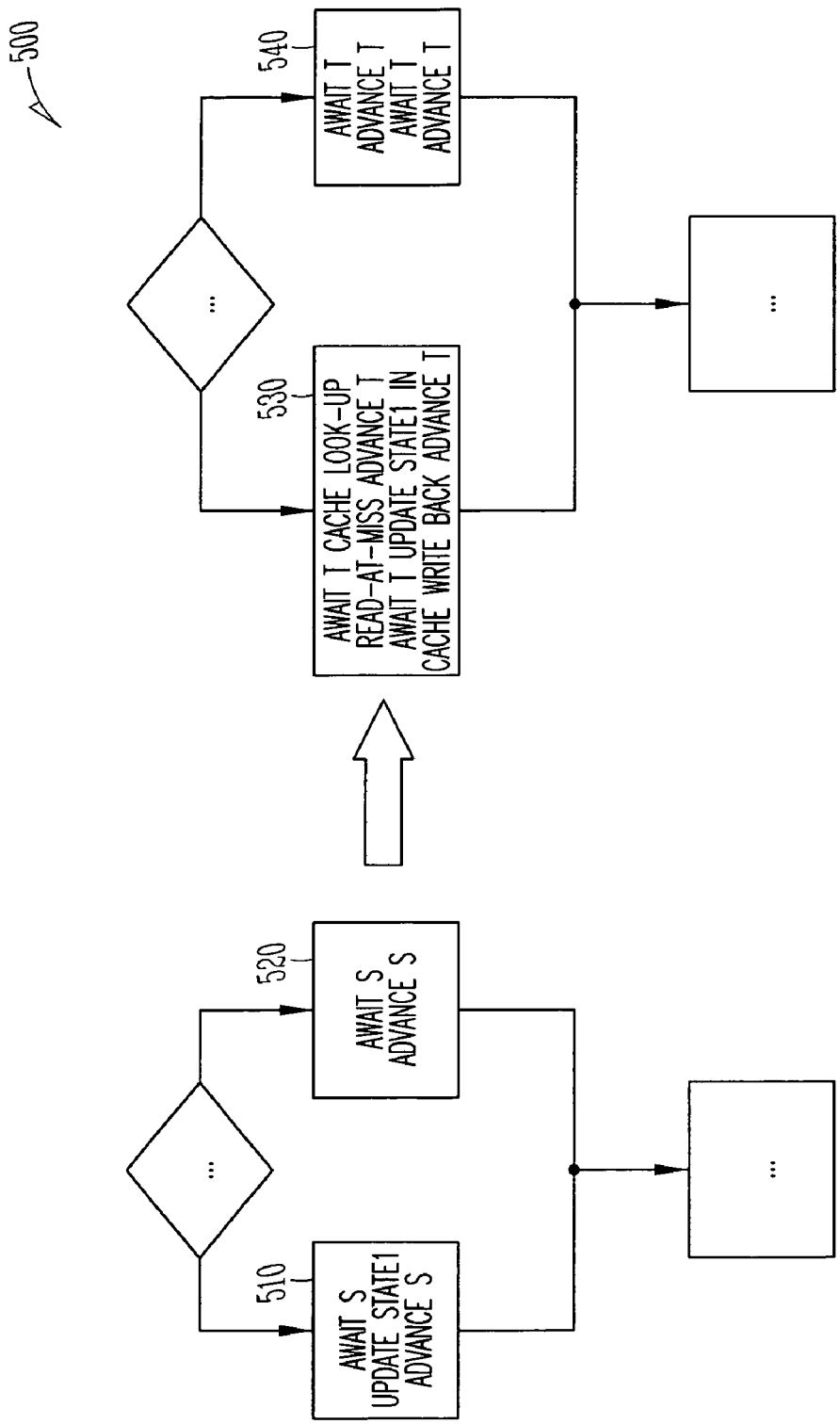
FIG. 5 is a diagram of software-controlled caching for updating data being processed in a multi-threaded and multi-processing environment, according to an example embodiment.

FIG. 5 is a diagram of software-controlled caching method 500 for updating data being processed in a multi-threaded and multi-processing environment, according to an example embodiment. The software-controlled caching is implemented in a machine-accessible and readable storage medium.

In any thread path of the update of global data or the packet, without a software-controlled caching process, there is one AWAIT operation and one ADVANCE operation for an update phase. In addition, any update of global states is included in the update phase of the processing. Thus, in the resulting software-controlled process the cache lookup and write-back operations are executed once before and once after each of the update operations in any given path of execution, respectively. Moreover, if no accesses are executed in a given path of execution to update the cache data, then an empty update phase for the corresponding read phase is used. This can be illustrated with the logic depicted in FIG. 5.

At 510, a processing thread waits for a signal "s" before proceeding with the update processing, once update processing completes the signal "s" is propagated to the next waiting thread. If no update processing takes place for a given thread, then, at 520, a processing thread waits for the signal "s" and then advances "s" by propagating "s" to the next thread.

The combined read and update processing phases are depicted in 530 and 540. Here, at 530, a particular thread waits for a signal "t" before requesting its data, if a cache miss is detected, then this indicates the data is not being requested by previous threads; otherwise a cache miss does not occur and the data is already available by reference in the cache.

Once a thread has read access to the desired data, the thread immediately passes a signal "t" onto the next thread and then waits for "t" to come back to it. When "t" comes back, this indicates that the thread can now update the data in the cache and has exclusive control. When the update is completed, "t" is advanced to the next thread awaiting volatile access to the data in the cache. If any given thread does not want to perform a volatile operation against the cache data, then, at 540, that thread simply waits and relays the signal "t" once for a read phase and once for an empty update phase.

The single update processing phase depicted in FIG. 1A can be transformed to a dual phase for a read phase and an update phase as depicted in FIG. 1B. To do this, a cache lookup and read-at-miss are inserted before volatile access is granted for a given thread, and the original update phase is modified to include another AWAIT and ADVANCE. All access to the global states of the data is changed to references to the cached data, and a write-back operation is performed before the ADVANCE.

Figure 6:
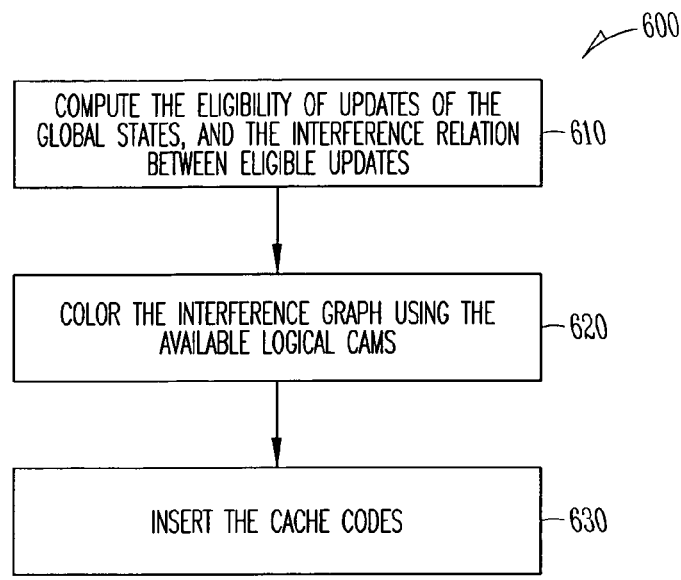
FIG. 6 is a diagram of a method to automatically implement the software control caching among multiple threads processing data in a multi-threaded and multi-processing environment, according to an example embodiment.

FIG. 6 is a diagram of a method 600 to automatically implement the software controlled caching among multiple threads processing data in a multi-threaded and multi-processing environment, according to an example embodiment. The method 600 (hereinafter "caching service") is implemented in a machine-accessible and machine-readable storage medium or may be accessible as electromagnetic signals over a network. The network may be wired, wireless, or a combination of wired and wireless.

The caching service first detects deadlock conditions that may be introduced by the software-controlled caching described above. A circular wait is present when an initial or first thread waits for signals from the last thread and a different thread is waiting for a signal from the first thread. The first thread in a particular processor waits for signals from the last thread under two conditions.

In the first condition, when the first thread reaches an AWAIT of the second phase, and the last thread has not reached an ADVANCE of the first phase, the first thread waits for the signal from the last thread. This is illustrated by Thread 0 of Processor 0 waiting for a signal from Thread 3 of Processor 0 in FIG. 1B. In this case, other threads cannot pass the AWAIT of the second phase (update phase) in their execution, until the last thread passes the ADVANCE of the first phase. If none of the other threads wait for signals from the first thread, deadlocks do not exist in the software-controlled caching process.

Since the ADVANCE of the first phase (read phase) is before the AWAIT of the second phase (update phase) in the processing flow, the program is free of deadlocks in the first condition if there is a path from an AWAIT "s" (the signal passed between threads) to an AWAIT of the second phase, where every path from the source to an AWAIT of the second phase includes an ADVANCE "s;" otherwise, that particular update is not eligible for software-controlled caching.

The second condition for a deadlock occurs in two separate software-controlled caching processes that use the same local CAM and that are being executed in a defined order. For example, when the first thread reaches an AWAIT of the first phase for the second caching process and the last thread has not yet reached an ADVANCE for a second phase of the first caching process, the first thread waits for the signal from the last thread. This condition is illustrated in FIG. 3B.

In such a case, other threads cannot pass the AWAIT of the first phase for the second caching processing in their execution until the last thread passes the ADVANCE of the second phase for the first caching process. If none of the remaining threads wait for signals from the first thread, then deadlocks do not exist in the process.

The program is free of deadlocks in the second condition, if there is a path either from an AWAIT "s" to an AWAIT of the first phase for the second caching process or from an AWAIT "s" to an ADVANCE of the second phase for the first caching process, where every path from the source to an AWAIT of the first phase for the second caching process includes an ADVANCE "s;" otherwise, the two updates cannot be cached using the same logical CAM and they are said to interfere with each other.

During the software-controlled caching process there may be attempts to cache multiple eligible updates of the global states associated with a particular piece of data. The two updates can be cached using different logical CAM's; however, if the updates interfere with each other then they cannot be cached using the same logical CAM. Thus, the transformation on the data in cache can be represented as an interference graph to detect the eligible updates, and a coloring algorithm may be processed to assign proper logical CAM's for each eligible update.

The caching service provides a transformation process to detect interference conditions on the data using multiple CAM's. At 610, the eligibility of updates associated with global states of the data and the interference relationships between the eligible updates are computed from the execution paths of the threads manipulating the data. At 620, a coloring algorithm is processed using the available logical CAM's. Next, at 630, the proper cache codes are inserted for the execution paths. The details of this processing will now be discussed in greater detail with FIGS. 7 and 8.

Figure 7:
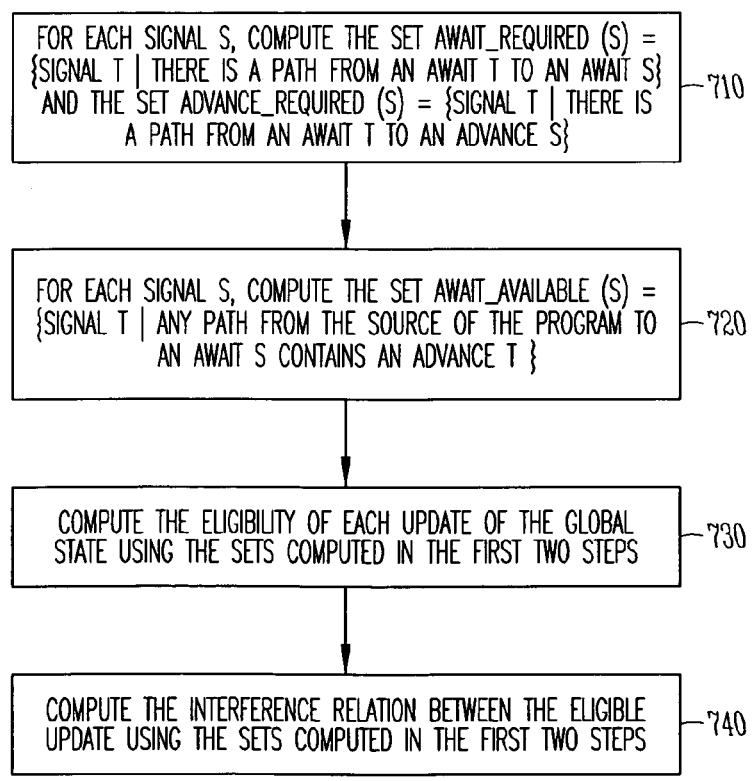
FIG. 7 is diagram of a method to determine eligibility and interference conditions among multiple threads processing data in a multi-threaded and multi-processing environment, according to an example embodiment.

FIG. 7 is diagram of another method 700 to determine eligibility and interference conditions among multiple threads processing data in a multi-threaded and multi-processing environment, according to an example embodiment. The method 700 (hereinafter "interference relation detection service") is implemented in a machine-accessible and machine-readable storage medium or is accessible over a network. The interference relation detection service expands on the processing of 610 from FIG. 6 to further illustrate how the eligibility and interference relation of updates are computed or resolved.

At 710, for each signal "s" a computation is performed to check the set of AWAIT_REQUIRED(s) where signal "t" has a path from AWAIT(t) to an AWAIT(s) and to check the set of ADVANCE_REQUIRED(s) where signal "t" has a path from an AWAIT(t) to an ADVANCE(s). The sets AWAIT_REQUIRED(s) and ADVANCE_REQUIRED(s) may be computed using a forward disjunctive dataflow analysis. Thus, for each instruction "n," the dataflow equations may be as follows:

GEN[n]={signal "t" I instruction "n" is an AWAIT(t) }; and

KILL[n]={ }.

Finally, AWAIT_REQUIRED(s)=Union IN[n], where "n" is an AWAIT(s) and ADVANCE_REQUIRED(s)=Union IN[m], wherein "m" is an ADVANCE(s).

At 720, for each signal "s" a computation is made to check the set AWAIT_AVAILABLE(s), where signal "t" is such that any path from the source to an AWAIT(s) includes an ADVANCE (t). The set AWAIT_AVAILABLE(s) may be computed using a forward conjunctive dataflow analysis. So, for each instruction "n," the dataflow equations may become:

GEN[n]={signal "t" I instruction "n" is an ADVANCE (t); and

KILL[n]={ }.

Finally, AWAIT_AVAILABLE(s)=Intersection IN[n], where "n" is an AWAIT (s).

At 730, the eligibility of each update of the global state is computed using the sets computed above at 710 and at 720. After an update is cached, the original AWAIT of its update section is replaced by the AWAIT of the second phase (update phase). Therefore, at 730, for the update of the global states, which is originally protected by the update phase and implemented using signal "s," that update is eligible for caching if AWAIT_REQUIRED (s) is a subset of AWAIT_AVAILABLE (s).

For two eligible updates, which are originally protected by the update phase and implemented using signal "s" and "t," respectively; either "s" is in AWAIT_REQUIRED (t) or "t" is in AWAIT_REQUIRED (s). At 740, the interference relation may be computed as follows:

(1) If "s" is in AWAIT_REQUIRED (t) and "t" is in AWAIT_REQUIRED (s), then they interfere with one another. In this case, the two updates are executed in different orders in different control flow paths and cannot be cached in a predefined order using the same logical CAM.

(2) If "s" is in AWAIT_REQUIRED (t) and "t" is not in AWAIT_REQUIRED (s), the two eligible updates do not interfere with one another if AWAIT_REQUIRED (t) is a subset of AWAIT_AVAILABLE (t) and ADVANCE_REQUIRED (s) is a subset of AWAIT_AVAILABLE (t). In this case, the update associated with the signal "s" is executed before the update associated with the signal "t" in any control flow path. Moreover, since the two updates are both eligible, AWAIT_REQUIRED (t) is ensured to be a subset of AWAIT_AVAILABLE (t), and hence only the second condition has to be checked.

(3) If "s" is not in AWAIT_REQUIRED (t) and "t" is in AWAIT_REQUIRED (s), then the updates do not interfere with one another if AWAIT_REQUIRED (s) is a subset of AWAIT_AVAILABLE (s) and ADVANCE_REQUIRED (t) is a subset of AWAIT_AVAILABLE (s).

The processing of the interference relation detection service presented in FIG. 7 details the processing of 610 of FIG. 6. The processing of 620 builds the interference graph for the eligible updates computed and resolved by the interference relation detection service. Moreover, the processing of 620 attempts to color the graph using the available logical CAM's. If a particular update cannot be colored, it cannot be cached. If a particular update can be colored, then it is cached using the logical CAM it is colored with. The processing of 630 of FIG. 6 is more fully described in FIG. 8.

Figure 8:
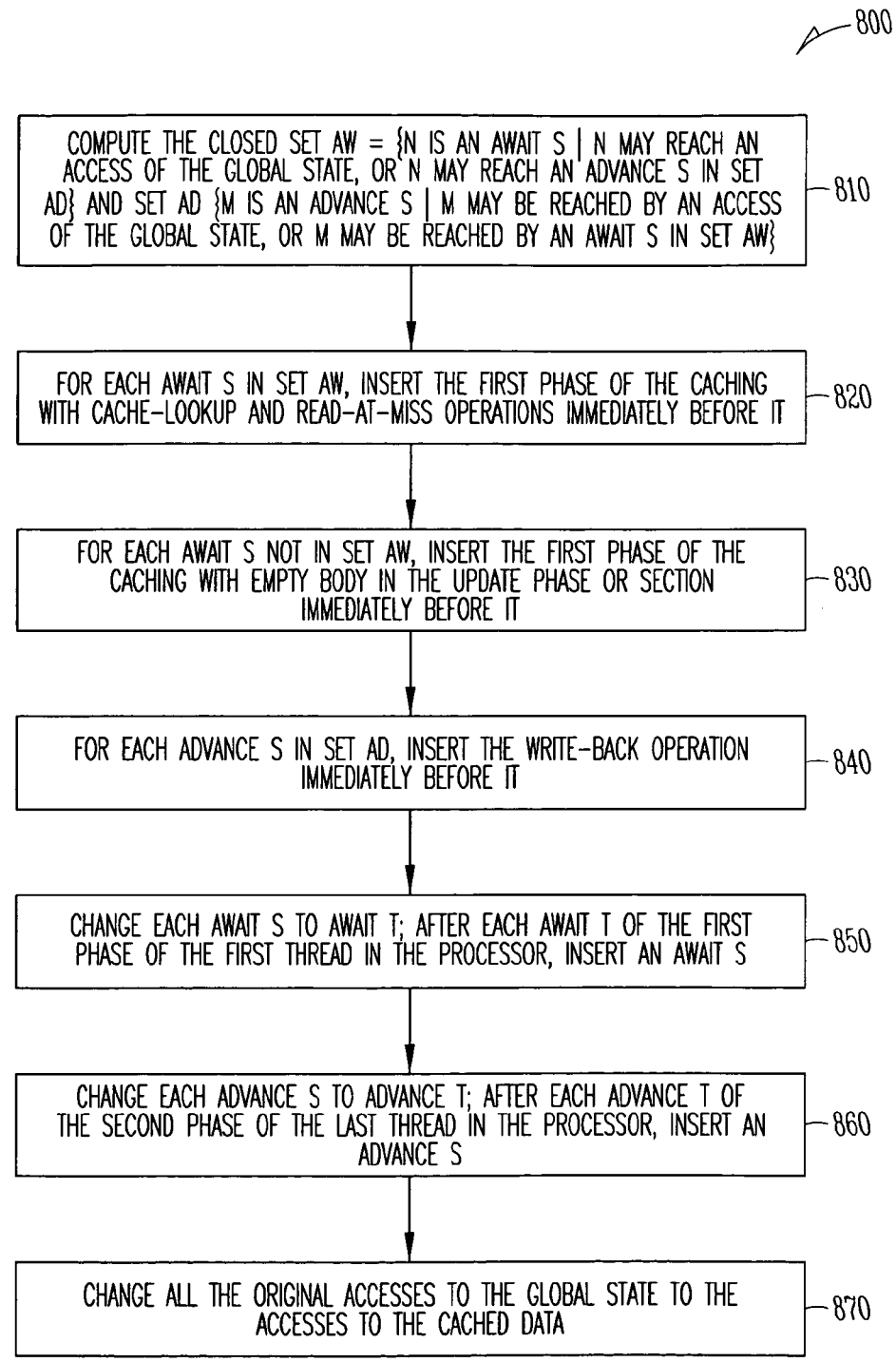
FIG. 8 is a diagram of a method to insert software caching codes using multiple caches for data being processed in a multi-threaded and multi-processing environment, according to an example embodiment.

FIG. 8 is a diagram of a method to insert software caching codes using multiple caches for data being processed in a multi-threaded and multi-processing environment, according to an example embodiment. The method 800 (hereinafter "cache coding insertion service") is implemented in a machine-accessible and machine-readable medium and is accessible over a network. The processing of the cache coding insertion service more fully describes the processing of 630 presented in FIG. 6.

The cache coding insertion service introduces a different signal to the threads used in the software-controlled caching; the different signal is introduced for each logical CAM. The software-controlled caching also implements the software-controlled caching for each eligible update colored with a particular logical CAM. Thus, the update of each global state, which is originally protected by the update phase implemented using signal "s," that is to be cached using the logical CAM associated with signal "t" is processed by the cache coding insertion service as depicted in FIG. 8.

At 810, a computation is made to check the closed set AW="n," where n is an AWAIT (s) and may reach an access of the global state or where "n" may reach an ADVANCE (s) in set AD. Set AD="m," where "m" may be reached by an access of the global state or "m" may be reached by an AWAIT (s) in the set AW. The sets AW and AD may be computed using two disjunctive dataflow analyses, one forward and one backward. The two sets AW and AD are essentially where the cached-read and write-back operations are desired.

At 820, the cached-read operation is inserted in the proper location within the software-controlled caching process. Thus, for each AWAIT (s) in the set AW the first phase (read phase) of the software-controlled caching (with a cache-lookup operation and a read-at-miss operation) is automatically inserted immediately before the AWAIT (s).

At 830, a thread's processing flow is detected where there is no volatile or non-volatile operations being performed by that thread on the cached data. For this situation, an empty cache read phase is created, as was described above with respect to FIG. 5. Accordingly, for each AWAIT (s) not in set AW; an empty body is inserted in the first phase (cache read section or phase). Stated another way, at 830, signals are passed unconditionally, and the cache read section or phase is empty.

At 840, a write-back operation is inserted in a thread's processing flow where a volatile operation is being performed by that thread against the cached data. Correspondingly, for each ADVANCE (s) in set AD, the wire-back operation is inserted immediately before that ADVANCE (s) to ensure the data is written back to cache before an ADVANCE occurs.

The processing of 850 and 860 changes the signaling in the software-controlled caching flow to implement the update phases or sections, in a manner that is visualized by FIG. 1B.

Finally, at 870, the original accesses made by the threads to the data are changed to access references to the cached data. After 870, other optimizations may be optionally implemented, such as partial redundancy elimination and copy-forwarding for purposes of optimizing the generated cached codes inserted by the cache coding insertion service.

The processing of the cache coding insertion service describes how the processing logic to implement the software-controlled caching presented herein may be implemented into an existing processing flow associated with threads that access the same data. The resulting software-controlled caching improves the efficiency of thread processing by substantially providing in parallel read access to the data from cache to all of the threads in a first phase. The second phase or update phase is then ordered and checked to ensure deadlock or interference conditions does not exist and to ensure updates occur in an atomic fashion.

Figure 9:
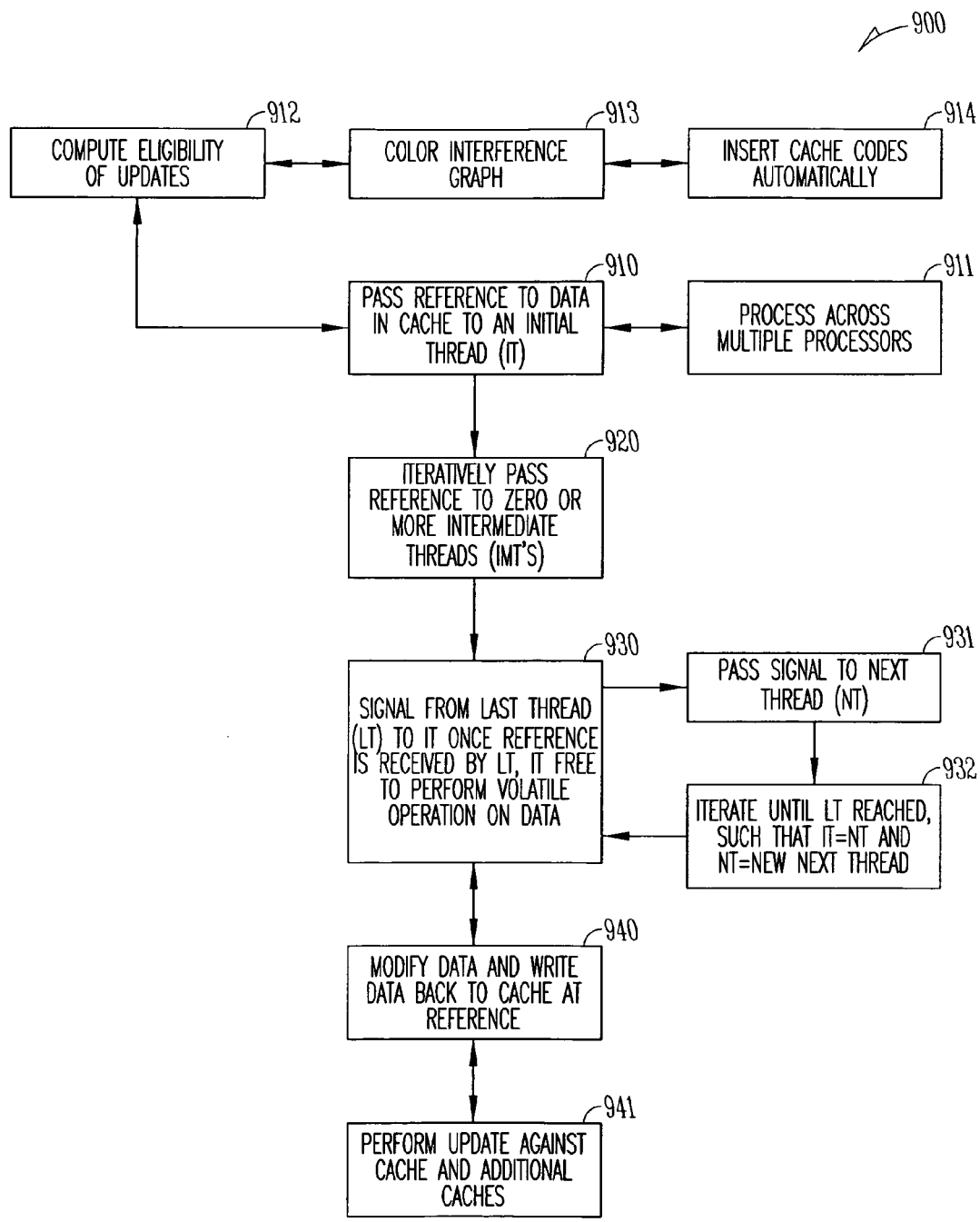
FIG. 9 is a diagram of a method to cache and process data in a multi-threaded and multi-processing environment, according to an example embodiment.

FIG. 9 is a diagram of a method 900 to cache and process data in a multi-threaded and multi-processing environment, according to an example embodiment. The method 900 (hereinafter "software-controlled caching service") is implemented in a machine-accessible and machine-readable storage medium or is accessible over a network. The software-controlled caching service represents processing for data being referenced by multiple threads in a multi-threaded and, optionally, a multi-processing environment. That is, the software-controlled caching service may be loaded and processed on a single processor or processed across multiple processors, as depicted at 911.

At 910, a reference to data housed in cache is passed to an initial thread. The data is read into cache at a location identified by the reference in response to the initial thread's attempt to read the data from memory or storage. This generates a read-at-miss instruction that directs the software-controlled caching service to initially acquire the desired data from its native memory or storage location and to place it into cache at the reference location.

In an embodiment, the processing depicted at 910 is achieved by modifying the caching process associated with a plurality of threads, such that, at 912, the eligibility of updates among the threads is computed. At 913, an interference graph for the updates is colored, and, at 914, cache codes are inserted automatically into the caching process for the threads to provide a dual phase processing; one for non volatile reads and one for volatile operations. Thus, the software controlled caching service may be viewed as two distinct processes one to automatically set up a dual phase caching process, represented by 912-914, and one to implement that dual phase during execution of the threads, represented by 910 and 920-941. Techniques for computing update eligibility, coloring an interference graph, and inserting cache codes were discussed in detail above with respect to FIGS. 6-8.

At 920, the reference to the data is iteratively passed to zero or more intermediate threads to a last thread. Each of the intermediate threads and the last thread are processing within the environment of the initial thread, and each is requesting access to the data. The reference to the data within the cache and identified by the reference location may be passed to the intermediate threads and the last thread in parallel or in substantial parallel, such that the threads do not experience any significant latency before the reference to the data is provided by the software-controlled caching service.

Once the last thread acquires the reference to the data within the cache, at 930, the last thread sends a signal to the initial thread, which informs the initial thread that it is now permissible to perform a volatile operation against the data within the cache at the reference location. After the initial thread performs its modifications on the data and writes the changes back to the cache at the reference location, the initial thread passes, at 931, a signal to a next thread. The next thread is either one of the intermediate threads or the last thread.

If, at 932, the next thread is not the last thread, then the processes of a particular thread acquiring exclusive and atomic access to the data for purposes of performing a volatile operation can sequentially iterate until the last thread acquires volatile access to the data and makes its desired changes to the data within the cache. Thus, a next thread assumes the role that the initial thread did during a single iteration, and the next thread signals a new next thread when it has written changes back to the reference location within the cache. This continues until each thread has performed its desired changes, if any, on the data within the cache.

Accordingly, at 940, during a single iteration, the data may be modified and written back to the cache at the reference location. In an embodiment, at 941, the update may be performed for the cache and for additional caches that also house the data. Techniques for coordinating updates across multiple same or different caches (e.g., CAM's) were presented above.

Figure 10:
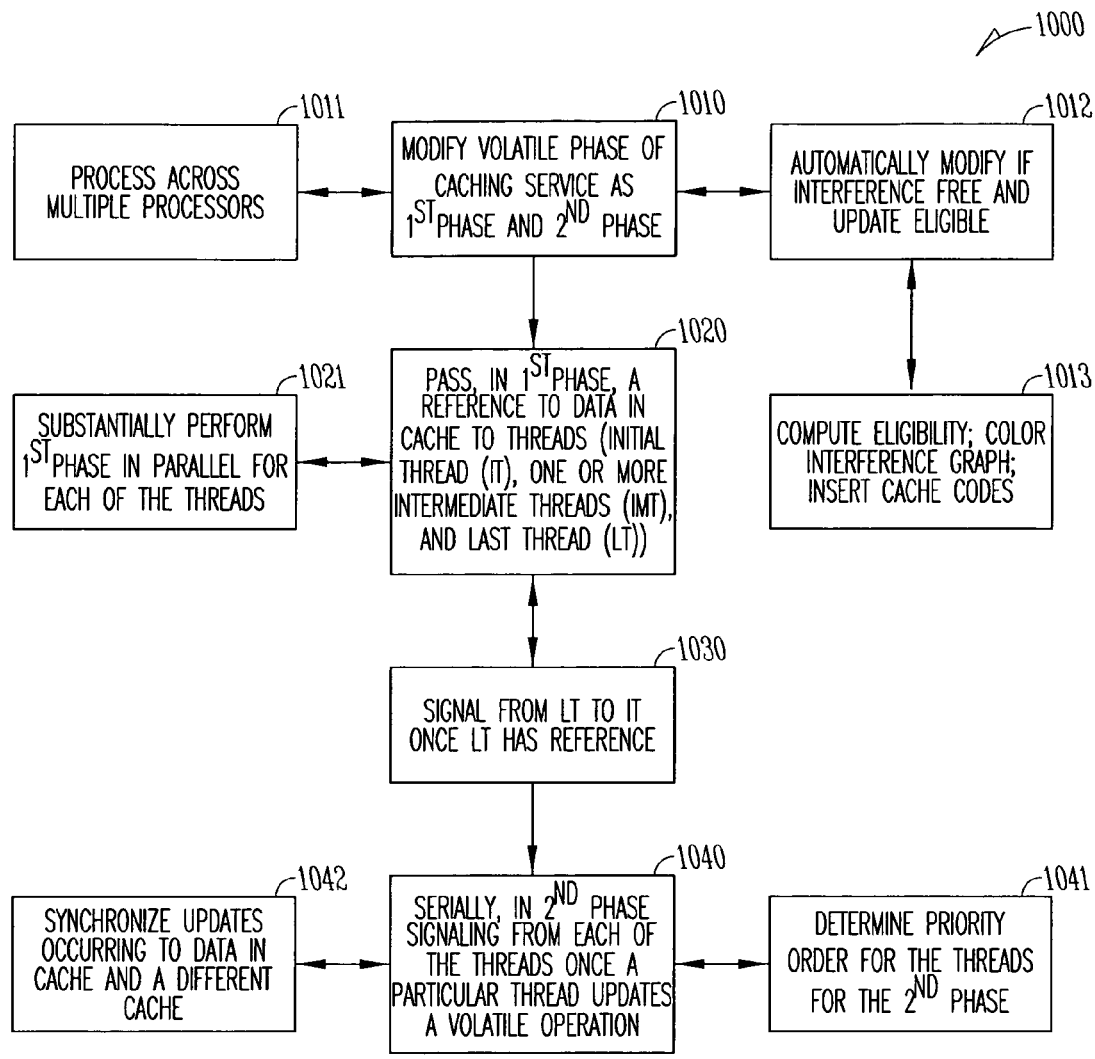
FIG. 10 is a diagram of a method to modify a cache service to process data in a manner depicted in FIG. 9, according to an example embodiment.

FIG. 10 is a diagram of a method 1000 to modify a cache service to process data in a manner depicted in FIG. 9, according to an example embodiment. The method 1000 is implemented as instructions within a machine-accessible and machine-readable storage medium. The instructions when processed by a machine perform the processing depicted in FIG. 10.

The instructions may reside in a removable medium and interface to a machine where they are uploaded and processed by the machine. Alternatively, the instructions may be prefabricated within memory or storage of a machine and executed by the machine. In still other embodiments, the instructions may be downloaded over a network from one machine and installed on another machine where they are processed. In yet other embodiments, the instructions may be executed remotely over a network on one machine at the direction of another machine. Moreover, the instructions process against multiple threads and in some optional embodiments may process across multiple processors associated with one or multiple machines, as depicted at 1011.

At 1010, the instructions modify the volatile or update phase of a caching service to create a two-phase process, if processing of the threads are interference free and update eligible. The initial and automatic process to generate the two-phase process occurs at 1012. That is, at 1013, the instructions compute eligibility for updates of the threads, colors an interference graph for the updates, and inserts the cache codes into the caching process for the threads to produce the two-phase process.

The first phase is associated with reading data being requested by multiple threads into cache and providing a cache reference to the data to each of the threads. The second phase controls volatile or update access to the data within the cache by maintaining an order to when a particular thread is given exclusive control to the data for purposes of performing a write operation (volatile operation).

At 1020, and during the first phase (read phase) a reference to the data in cache is passed to each of the threads. For the initial thread, a read-at-miss operation occurs, which directs the instructions to acquire the data initially from its native memory or storage location. The reference to the data within the cache is then successively passed in a substantially parallel manner, at 1021, to each of the remaining threads, which may include zero or more intermediate threads and a last thread.

At 1030, once the last thread has a reference to the data within the cache, it signals the initial thread. This transitions the caching from the read phase to the update phase (second phase).

During the second phase, at 1040, each thread serially signals a next thread once a particular thread has completed updating or performing a volatile operation against the data within the cache. In an embodiment, at 1041, a priority order for the threads may be determined in response to when a thread requests access to the data. Thus, an initial thread is the first thread because it made the first request for the data and generated the read-at-miss operation performed by the instructions.

In an embodiment, at 1042, each update to the data by a particular thread may occur to the cache and simultaneously occur to different caches. Thus, the updates to the data may be synchronized across multiple caches. The caches may be the same logical CAM's or different CAM's as was described above.

Figure 11:
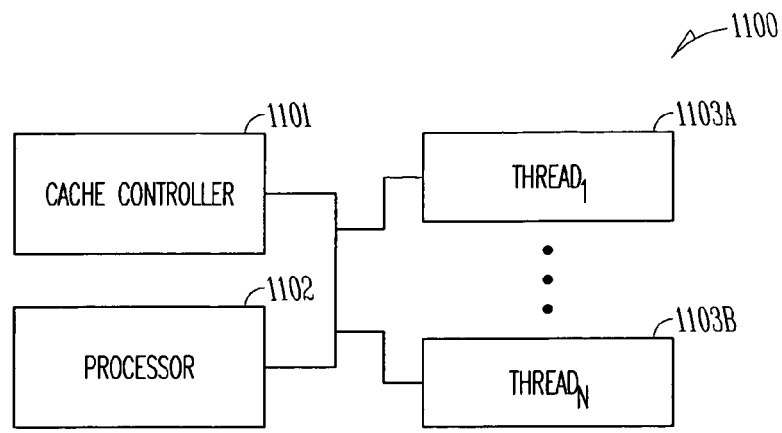
FIG. 11 is a diagram of a caching apparatus, according to an example embodiment.

FIG. 11 is a diagram of a caching apparatus 1100, according to an example embodiment. The caching apparatus 1100 is implemented within a machine-accessible and machine-readable storage medium or is optionally accessible over a network as electromagnetic signals.

The caching apparatus 1100 includes a cache controller 1101 and a processor 1102. The processor 1102 executes the cache controller 1101 as software instructions, and the cache controller 1101 handles data access being requested by multiple threads 1103A-1103B. The processor 1102 also executes the multiple threads 1103-1103B.

The cache controller 1101 performs the processing described above with respect to methods 900 and 1000 of FIGS. 9 and 10, respectively. That is, the cache controller 1101 provides a dual-phase caching technique to the multiple threads 1103A-1103B for data being requested by the multiple threads 1103A-1103B.

In the first phase, data is read into a reference within the cache on a read-at-miss operation or when the data is initially being requested by an initial thread 1103A. After the data is read into cache, the reference to that data is propagated substantially in parallel to all the remaining threads 1103B. Once a last thread 1103B has a read reference or access reference to the reference for the data within the cache, then the last thread 1103B sends a signal to the first thread 1103A. The signaling and flow are managed by the cache controller 1101. The initial thread 1103A then acquires exclusive and atomic volatile access to the data within the cache and makes its changes and writes the changes back to the cache. Next, the initial thread 1103A signals a next thread 1103B to indicate to the next thread 1103B that the next thread 1103B has exclusive volatile access to the data within the cache. This continues in a serial fashion until a last thread 1103B completes its updates to the data within the cache. At this time, a signal may optionally be sent to a different thread processing on a different processor.

In an embodiment, the cache controller 1101 may synchronize changes being made to the data within the cache to multiple additional caches. Moreover, in some cases, the additional caches may exist on different processors from the processor 1102.

In yet another embodiment, the cache controller 1101 may inspect the processing flow of the threads 1103A-1103B and decide that two or more threads interfere with one another, such that a deadlock condition may exist. In these embodiments, the cache controller 1101 may remove the data from the cache and instruct the threads 1103A-1103B to acquire the data via a different or suitable access mechanisms from the memory or storage associated with the data.

Figure 12:
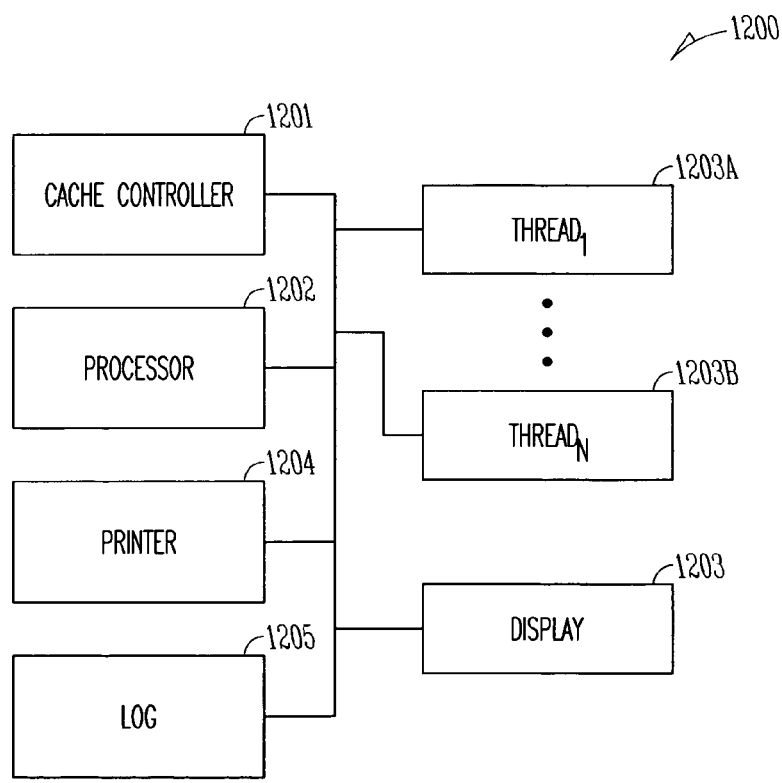
FIG. 12 is a diagram of a caching system, according to an example embodiment.

FIG. 12 is a diagram of a caching system 1200, according to an example embodiment. The caching system 1200 is implemented in a machine-accessible and machine-readable storage medium. The caching system 1200 includes the caching apparatus 1100 of FIG. 11 and includes additional components.

More specifically, the caching system 1200 includes a cache controller 1201, a processor 1202, and a display 1203. The processor 1202 executes the cache controller 1201 and a plurality of threads 1203A-1203B, which desire access to data. The caching system 1200 may also include a printer 1204 and a log 1205. Each of these will now be discussed in turn.

The cache controller 1201 performs the techniques presented above with respect to the cache controller 1101 of FIG. 11. Similarly, the processor 1202 performs the processing presented above with respect to the processor 1102 of FIG. 11. The threads 1203A-1203B operate against the data and acquire the data from the cache controller 1201 via cache in the manners presented above with respect to the threads 1103A-1103B of FIG. 11.

The display 1203 presents states or results associated with the cache controller 1201 or the one more caches being managed by the cache controller 1201.

In an embodiment, the caching system 1200 also includes a printer 1204. The printer 1204 prints states or results associated with the cache controller 1201 or with the one or more caches being managed by the cache controller 1201.

In yet another embodiment, the caching system 1200 includes a log 1205. The log 1205 records or houses states or results in memory or storage that are associated with the operation of the cache controller 1201 or with the one or more caches being managed by the cache controller 1201.

The above description is illustrative and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter may lie in less than all features of a single disclosed embodiment. Thus the following claims are hereby incorporated into the Description of the Embodiments, with each claim standing on its own as a separate exemplary embodiment.

What is claimed is:

1. A method, comprising:
   passing a reference to data in cache to an initial thread;
   iteratively passing the reference to a next thread until a last thread is reached, wherein the next thread comprises one of an intermediate thread and the last thread;
   signaling from the last thread to the initial thread that the data in the cache is available for an initial volatile operation processed by the initial thread; and
   signaling from the initial thread to the next thread that the next thread is eligible to perform a next volatile operation against the data after the initial volatile operation has updated within the cache.

2. The method of claim 1 further comprising, iteratively signaling from the next thread to a new next thread after updates to the cache occur against the data until the last thread is reached.

3. The method of claim 1 further comprising:
   computing eligibility of updates for the initial thread, zero or more intermediate threads, and the last thread for updates;
   coloring an update interference graph for the initial thread, the zero or more intermediate threads, and the last thread, wherein the interference graph includes an interference relation for the initial thread, the zero or more intermediate threads, and the last thread; and
   inserting cache codes, if eligibility exists, wherein the cache codes automatically permit the processing the method.

4. The method of claim 3, wherein coloring further includes using available logical content addressable memory (CAM) units associated with the initial thread, the zero or more intermediate threads, and the last thread.

5. The method of claim 1, wherein signaling further includes:
   modifying the data by the initial thread; and
   writing the data as modified data back to the cache at a location of the reference.

6. The method of claim 1 further comprising, processing the method across multiple processors.

7. The method of claim 1 further comprising, performing the update against the cache and one or more additional caches, which are used by zero or more intermediate threads or the last thread.

8. A machine-readable storage medium having associated instructions, which when processed, result in a machine performing:
   automatically modifying a volatile phase of a caching service to include a first phase and a second phase, if processing associated with a plurality of threads is interference free and eligible for modification;
   passing, during a first phase, a reference to data in a cache to the plurality of threads that includes an initial thread, zero or more intermediate threads, and a last thread;
   signaling from the last thread to the first thread once the last thread has the reference; and
   serially, during the second phase, signaling from each of the threads beginning with the initial thread once a current processing thread has updated modifications to the data in the cache.

9. The medium of claim 8, further including instructions to process the instructions across multiple processors, wherein each processor includes a different cache.

10. The medium of claim 9, further including instructions to synchronize updates occurring to the data in the cache and the different cache.

11. The medium of claim 8, further including instructions for:
   computing eligibility of updates of global states and an interference relation between the updates for the plurality of threads;
   coloring an interference graph for the plurality of threads using available logical content addressable memory units, wherein the interference graph includes an interference relation for the plurality of threads; and
   inserting cache codes into processing associated with the plurality of threads to perform the instructions of the medium.

12. The medium of claim 11, further including instructions to substantially perform the first phase in parallel for each of the threads.

13. The medium of claim 11, further including instructions to determine a priority ordering of the threads to process the second phase.

* * * * *